US005781647A

United States Patent [19]

Fishbine et al.

[11] Patent Number: 5,781,647

[45] Date of Patent: Jul. 14, 1998

[54] GAMBLING CHIP RECOGNITION SYSTEM

[75] Inventors: Glenn M. Fishbine, Eden Prairie; Jack Klingert, Minnetrista, both of Minn.

[73] Assignee: Digital Biometrics, Inc., Minnetonka, Minn.

[21] Appl. No.: 962,915

[22] Filed: Oct. 27, 1997

Related U.S. Application Data

[63] Continuation of Ser. No. 539,779, Oct. 5, 1995, abandoned.

[51] Int. Cl.$^6$ .................... G06K 9/00

[52] U.S. Cl. .................... 382/1; 235/375; 235/472

[58] Field of Search .................... 382/1, 375, 472

[56] References Cited

U.S. PATENT DOCUMENTS

| | | | |
|---|---|---|---|
| 3,526,971 | 9/1970 | Shipley . | |
| 4,283,709 | 8/1981 | Lucero et al. . | |
| 4,531,187 | 7/1985 | Uhland . | |
| 4,685,147 | 8/1987 | Honjo . | |
| 4,764,666 | 8/1988 | Bergeron . | |
| 4,814,589 | 3/1989 | Storch et al. . | |
| 4,841,129 | 6/1989 | Tawara et al. . | |
| 4,899,392 | 2/1990 | Menton | 382/1 |
| 4,924,088 | 5/1990 | Carman et al. . | |
| 4,926,327 | 5/1990 | Sidley . | |
| 5,103,081 | 4/1992 | Fisher et al. . | |
| 5,173,589 | 12/1992 | Diehl et al. . | |
| 5,235,618 | 8/1993 | Sakai et al. . | |
| 5,259,613 | 11/1993 | Marnell, II . | |
| 5,283,422 | 2/1994 | Storch et al. . | |
| 5,321,241 | 6/1994 | Craine . | |
| 5,326,104 | 7/1994 | Pease et al. . | |
| 5,387,785 | 2/1995 | Gatto et al. . | |
| 5,411,258 | 5/1995 | Wilson et al. . | |
| 5,414,251 | 5/1995 | Durbin . | |

FOREIGN PATENT DOCUMENTS

| | | |
|---|---|---|
| 4439 502 C1 | 9/1995 | Germany . |

*Primary Examiner*—Harold Pitts
*Attorney, Agent, or Firm*—Merchant, Gould, Smith, Edell, Welter & Schmidt, P.A.

[57] ABSTRACT

A computer implemented gambling chip recognition system having the ability to capture an image of a stack of gambling chips and automatically processing the image to determine the number of chips within the stack and the value of each. The system processor determines the classification for each chip in a stack by way of processing performed in real time on the image of the stack of gambling chips. The system further includes the ability to communicate the information derived from the stack of gambling chips to a video monitor and the ability to communicate the information to a main database where information is being compiled and stored about an individual gambler.

16 Claims, 2 Drawing Sheets

PV 1,1

GAMBLING CHIP RECOGNITION SYSTEM

This is a File Wrapper Continuation of application Ser. No. 08/539,779, filed Oct. 5, 1995 now abandoned.

FIELD OF INVENTION

The present invention relates to a computer implemented system for capturing and processing an image of a stack of gambling chips for counting the number of chips and determining the value of each within the stack.

BACKGROUND OF THE INVENTION

In the casino business there is an established reward/perk system that is used to determine the level of complimentary benefits valued customers should receive. Presently, this system is managed and performed by a person such as a casino supervisor/floor manager. The supervisor/floor manager keeps detailed notes about certain players and tries to determine over an extended period, the length of time a player gambles, the total amount of money bet in one sitting, the average amount wagered at each bet, etc. By knowing the value of a player's wagers and their gambling habits, the casino decides which players are to receive complimentary benefits. The level of benefits is determined by a player's level of gambling.

Presently, a player's level of gambling is determined solely by the notes of the gambling floor supervisor/manager. This is a very subjective system that is often difficult to maintain because a floor/manager cannot watch all players at all times to get accurate information on betting habits.

There is a need for a system that assists gambling operations at casinos in accurately tracking the gambling habits of its customers. Such a system would be helpful to a casino by making the reward/perk system more consistent. The reward/perk system would better serve its purpose because the guess work would be taken out of determining a player's gambling habits. Knowing exactly the length of the time played, amount of money bet and average amount wagered at each bet would be very helpful in providing the right incentives and complimentary benefits (free meals, limo, room, etc.) to the right players. Such a system could also be used to determine a player's pre-established credit rating.

DESCRIPTION OF THE PRIOR ART

In the past, gambling chip recognition systems such as that disclosed in U.S. Pat. No. 4,814,589 to Storch et al. involved counting gambling chips and detecting counterfeit chips using a binary code placed on the edge of the chip. The system is designed to count chips and detect counterfeits at a gaming table while the chips are in a rack. Using this data, a casino could monitor the number of available chips and other statistical information about the activity at individual tables. One of the problems with the system disclosed in U.S. Pat. No. 4,814,589 is that the system requires the disc-like objects, such as gambling chips, coins, tokens, etc., have machine readable information encoded about the periphery thereof. Another system having similar problems is disclosed in U.S. Pat. No. 5,103,081 to Fisher. It describes a gambling chip with a circular bar code to indicate the chips denomination, authenticity and other information. The chip validating device rotates the chip in order to read the circular bar code.

The above mentioned prior art systems are particularly cumbersome in that they require chips to be housed within a particular system and rotated to be read or positioned at the right angle or in a rack so that the information can be taken from the periphery of the chips. There is a need for a system that can determine the value of gambling chips without encoding the periphery of each chip to enable system determination of its value. There is a need for a system that can determine the value of a chip without it being housed within a special reading device. There is a need for a system that can read a chip that it positioned at any angle on a gaming table in the betting position. Such a system could cut down on casino expenses by deleting the cost to encode such chips with readable information.

SUMMARY OF THE INVENTION

The present invention is a casino gambling chip recognition system that provides for the automatic determination of the number of chips within a stack of gambling chips and the value of each chip within the stack through the use of a classification scheme stored in the computer wherein the classification scheme may include geometry, color and size of a preselected set of chips. The classification scheme data is used as a reference for a real time captured image of the stack of gambling chips. The system captures an image of the stack of gambling chips and processes the image by comparing the classification scheme data extracted from each chip within the stack of gambling chips with preexisting classification scheme data representative of a complete set of gambling chips. The system determines the value of each chip within the stack of gambling chips by way of the comparison and displays the total number of chips counted and their monetary value. The system also provides the communication of the number and value of chips wagered by players to a main computer for storage in a centralized player data base.

BRIEF DESCRIPTION OF THE DESCRIPTION OF THE DRAWINGS

FIG. 1 is a block diagram representation of a system which can be used to capture and process a stack of gambling chips in accordance with the present invention; and FIG. 2 is a graphical representation of the captured image of a stack of gambling chips after being digitized by the frame grabber shown in FIG. 1.

GENERAL DESCRIPTION OF THE INVENTION

The present invention is a gambling chip recognition system comprising a processor, data storage, an imager and a communication link. The gambling chip recognition system images a pile of gambling chips. The image of the gambling chip pile is processed by the processor to derive from the image the count and class of each chip within the pile. The count and class of each chip within the pile may be communicated by way of a real time display monitor or to another main system database, via the communication link, where information is collected about individual gamblers.

DETAILED DESCRIPTION OF THE INVENTION

As required, detailed embodiments of the present invention are disclosed herein. However, it is to be understood that the disclosed embodiment is merely exemplary of the invention, which may be embodied in various forms. Therefore, specific structural and functional details disclosed herein are not to be interpreted as limiting but rather as the basis for the claims and as a representative basis for teaching one skilled in the art to employ the present invention in virtually any appropriately detailed system.

Figure 1:
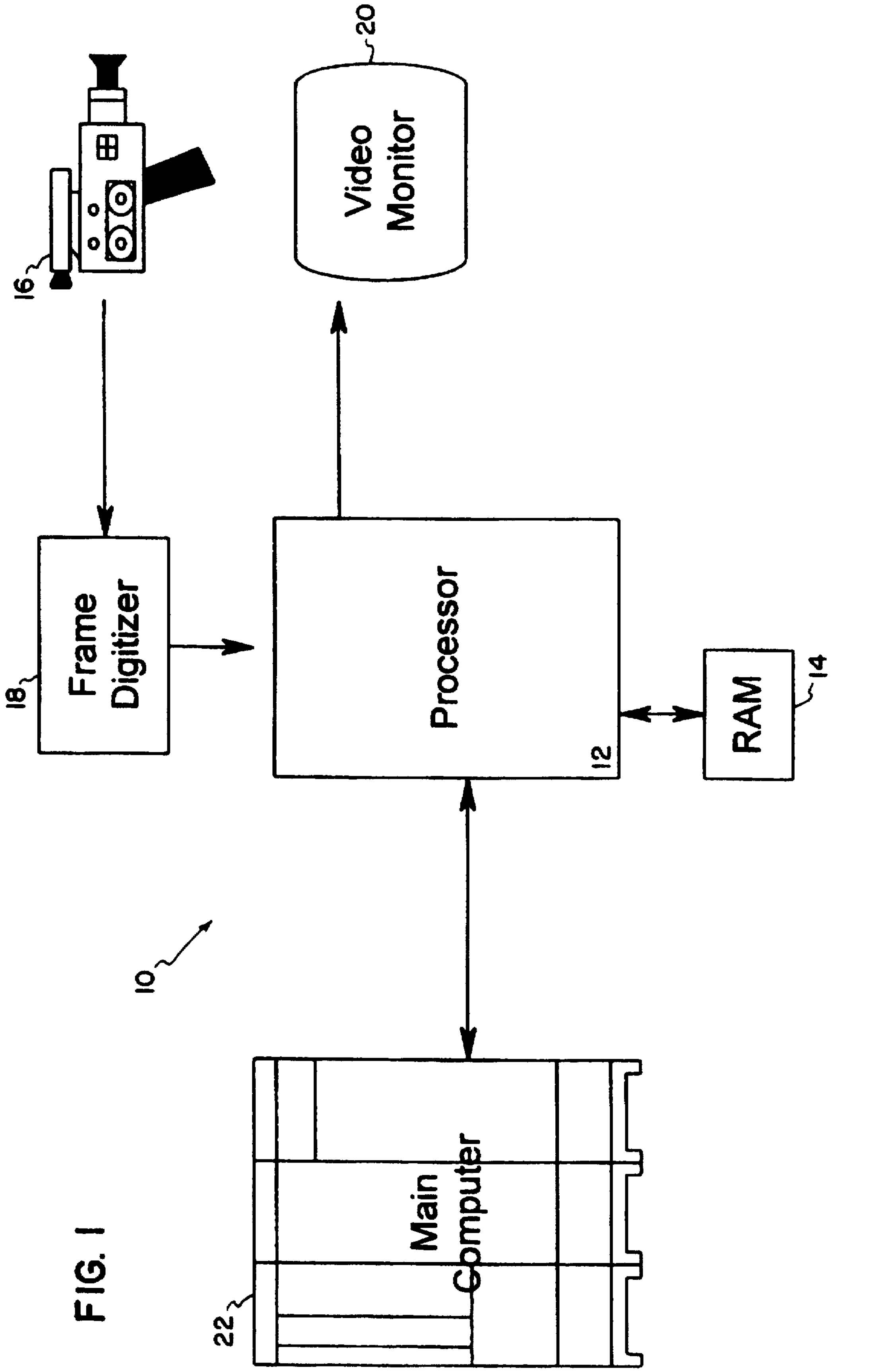

Referring to the drawings, an embodiment of the gambling chip recognition system is illustrated generally in FIG. 1. Gambling chip recognition system 10 is a microprocessor based system which includes a processor 12, data storage 14, an imager 16, a digitizer 18 and a communication link 20. In the embodiment shown in FIG. 1, a pile of gambling chips is imaged by a video camera 16 and digitized by the frame grabber digitizer 18. The digitized image is stored in RAM 14 (Random Access Memory) as arrays of digital data representative of the gambling chip piles. RAM 14 is electrically interconnected to the digitizer 18. The processor 12 accesses the digital data stored in RAM 14 and processes the data in accordance with a computational program to derive from the image the count and class of each chip within the pile. The results may be communicated to the system user by way of a video monitor 20 or communicated to another system where the resultant information is added to a player database within the main computer 22 where information is collected about individual gamblers. It is to be understood that this invention is not limited to the above-mentioned methods for communicating resultant information. The above methods are listed as examples of methods used in the embodiment disclosed in FIG. 1.

The gambling chip recognition system imager 16 is comprised of a plurality of video cameras, one for each gambling position on the gaming table. Each camera being commercially available and using conventional rasters and scanning rates. The gambling chip recognition system 10 illustrated in FIG. 1, shows only one video camera 16. It is to be understood that the present embodiment can utilize any number of video cameras. The number of cameras is determined by the number of gambling positions that need to be monitored. For purposes of illustration and simplifying the description, one camera is described and shown.

The imager 16 may be implemented in a plurality of different ways. For example, in another embodiment (not shown), the imager 16 is a high resolution camera mounted in relation to a gaming table such that a full view of all betting positions are within the camera's field of view. The camera continuously images all gambling chip stacks at the gaming table betting positions and generates frames of video signals representative thereof. In another embodiment, the imager is a single camera having a pan-tilt mechanism employed whereby the camera is repositioned and refocused on each gambling chip pile separately. It is to be understood that other embodiments of the imager may be utilized and that structural or logical changes to the system may be made without departing from the scope of the present invention.

Figure 2:
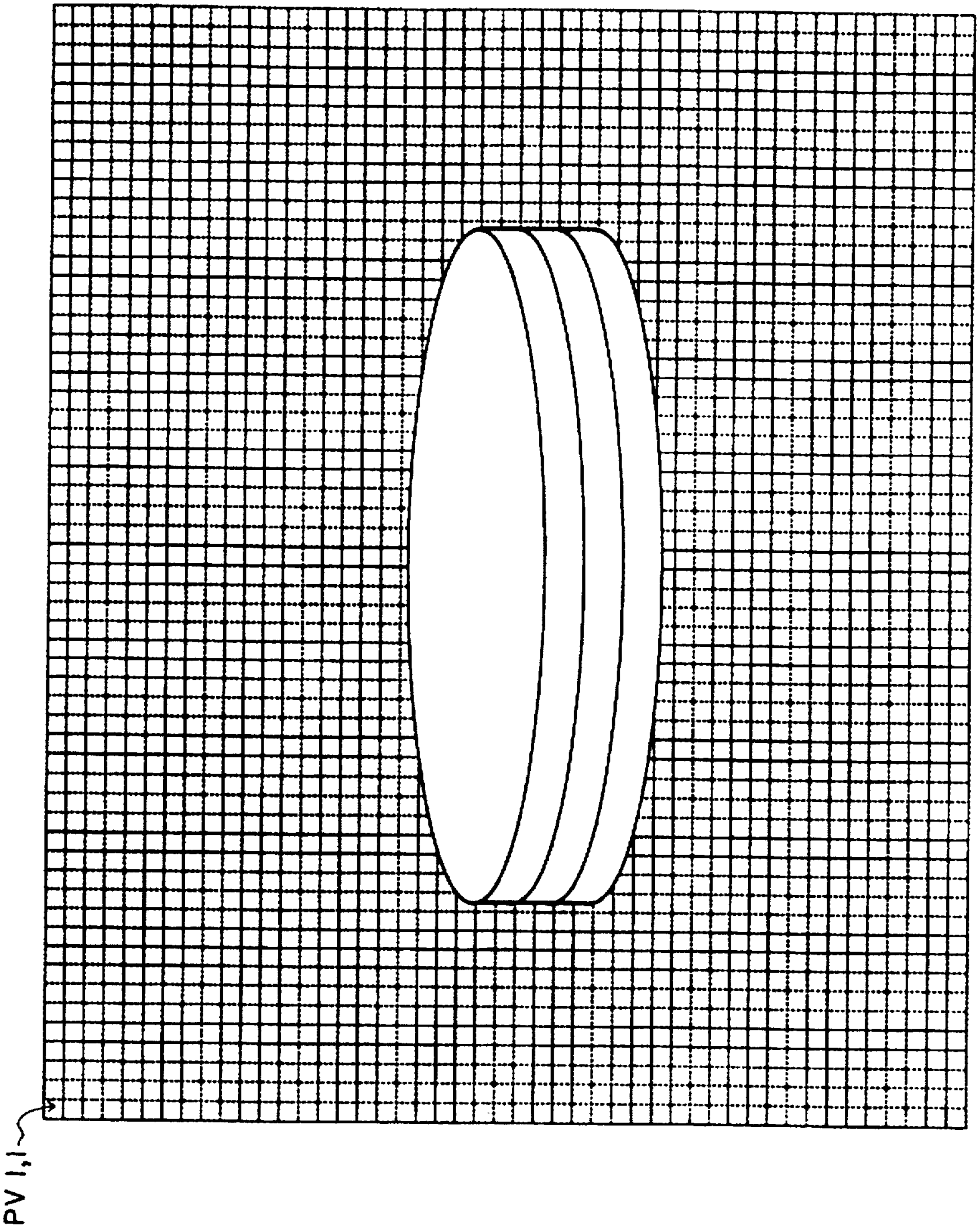

The digitizer is electrically connected to the imager 16 and processor 12. The digitizer 18 is controlled by processor 12 and digitizes frames of video signals currently being generated by video camera 16 when commanded by the processor 12. Camera 16 continuously images a stack of gambling chips through its objective lens and generates frames of video signals representative thereof. The digitizer 18 produces two dimensional arrays of digital pixel values representative of the intensity of the pixel values of the video images captured by camera 16 at corresponding discrete pixel locations. An image array having pixel values PVr,c corresponding to a stack of gambling chips is illustrated in FIG. 2. Image arrays are formed by horizontal rows and vertical columns of pixel values (PVr,c).

In the embodiment shown in FIG. 1, the digitizer 18 captures a frame of a video signal generated by video camera 16 and digitizes the video image into an array of r=640 rows by c=480 columns of N-bit pixel values. The number of bits (N) in a pixel value is dependent upon the classification scheme employed. The classification scheme employed may be a grey-scale or color digital scale representation having N bits of image data for each pixel. The present embodiment utilizes 24 bits (N=24) of image data to represent an RGB color scale format. Each pixel in the 640 by 480 matrix of pixels consists of red, green and blue color components. Within each pixel having 24 bits of data, there are 8 bits of data representing blue, 8 bits of data representing green and 8 bits of data representing red. It can be appreciated that quantifying the three color components for each pixel in accordance with the above described 24 bit format provides up to $2_{24}$ color combinations. It is to be understood that there are other formats and embodiments for complementing an RGB color scheme of pixel data. In many situations, the pixel data format is dependent upon the particular CPU (Central Processing Unit) of the host computer system.

The digitizer 18 stores the array of digital data in a data storage 14. Data storage 14 is provided as an adjunct electrically connected to the digitizer 18 to provide computational access to the digitized portions of the resultant image. The data storage 14 may be digital or analog, including conventional RAM, conventional disk, or a byte-sized register which passes bytes of digital data to the processor in a manner which permits serial access to the data. The serial stream of data flowing through the register into the processor may flow in a manner consistent with the computation even though only one byte may be available at each computational cycle.

The processor is a commercially available processor such as an Intel Pentium which permits manipulation of the digitized image to enable the derivation of chip information from the digital representation of the pile of gambling chips. One of ordinary skill in the art would recognize that the processing may be performed with both analog or digital processors, and implemented in both software and hardware designs. The function of the processor would be to derive sets of information unique to counting and determining a chip representation for each chip. The information would be used to classify each chip within a particular set of gambling chips.

In this embodiment the storage medium is random access memory, RAM 14. The processor 12 determines the presence or absence of a stack of gambling chips in the image currently being processed by computing variance values for an array of data stored in RAM 14. The variance values VARr,c are computed by compiling variance for each pixel value PVr,c along a moving window of 18 pixels on every 50 (horizontal and vertical) pixels and determining that point in the "cross section" where the variance grows to a large value indicative of a statistical edge value. Variance can be determined values in accordance with the variance value equation described in table 1 shown below:

TABLE 1

Variance Equation $$VAR_{r,c} = \frac{\left[ \sum_{k=m-p}^{m+p} (PV_{n,k})^2 \right] - \left[ \frac{\left( \sum_{k=m-p}^{m+p} PV_{n,k} \right)^2}{2P+1} \right]}{2P+1}$$

After variance values VARr,c have been computed in the above-described manner, they are compared to a threshold variance value THR. Threshold variance THR is selected as a function of factors affecting the image such as the color of the gaming table. A threshold variance value THR >800 is used in the present embodiment. Generally all variance values computed for the moving window of 18 pixels will be less than the threshold THR if a pile of gambling chips has not been positioned on the gaming table. If the image array does include pixel values characteristic of a stack of gambling chips, some variance values VARr,c within the captured image will be greater than the threshold THR.

When it is desired to capture a gambling chip pile image, the operator will actuate a foot pedal or some other control method to place the gambling chip recognition system in capture mode. Assuming that a stack of gambling chips are positioned on the gaming table in the appropriate position when the capture mode has been engaged, data representative of the stack of gambling chips will be stored in RAM 14 as an image array. The RAM 14 is provided as an adjunct to the digitizer 18 and provides computational access to the digitized image array. While processing variance values VARr,c for the selected window of an image array in the manner described above, processor 12 will recognize the fact that it includes stacked gambling chip features since it includes variance values greater than or equal to threshold value THR.

Having identified an image array which includes pixel values representative of a stack of gambling chips, processor 12 next determines the edge of each gambling chip which is defined by pixel values including edge characteristic data of a gambling chip stack. In one embodiment, processor 12 identifies the left edge of the gambling chip stack image by determining the closest column to the left edge of the image array which has a variance value VARnm greater than threshold value THR. By sequentially comparing the variance values within the pixel window VARn,1, VARn,2, etc. to threshold THR equal to 800, processor 12 can identify its left most variance value within the gambling chip stack array which exceeds the threshold. Data characterized in the left edge of the gambling chip stack array is subsequently stored in RAM 14. Using a similar procedure that is sequentially comparing variance values in the right, top and bottom most edges of a gambling chip stack array to a variance value, the right, top and bottom edges of the gambling chip stack array will be determined by processor 12.

In the present embodiment, following identification of the portion of the image in which one or more stacks of chips reside, processor 12 performs the identification processes to derive those portions of the image which uniquely contain only the edge information of one or more chips. The edges of each individual chip is located by applying a sobel edge detection filter in both horizontal and vertical directions. The horizontal and vertical sobel edge detection kernels utilized are illustrated below in tables 2 and 3:

TABLE 2

| Vertical Sobel Kernel |
|---|
| $$\begin{bmatrix} -1 & 0 & 1 \\ -2 & \boxed{0} & 2 \\ -1 & 0 & 1 \end{bmatrix}$$ |

TABLE 3

| Horizontal Sobel Kernel |
|---|
| $$\begin{bmatrix} -1 & -2 & -1 \\ 2 & \boxed{0} & 0 \\ 1 & 0 & 1 \end{bmatrix}$$ |

Using the horizontal and vertical sobel kernels, we can define a non-directional edge detector for an image $F(n_1,n_2)$ as shown below in table 4:

TABLE 4

| Edge Detection Algorithm |
|---|
| $$\|\nabla f(x, y)\| = \sqrt{(f_x(n_1, n_2))^2 + (f_y(n_1, n_2))^2}$$ |

Using the enhanced gambling chip pile pixel values within the above conventional edge following algorithm, a preset ellipsoidal representation of the edge can be determined. Utilizing the preset information regarding the height of the chips for a given chip length, the boundaries of each individual chip can be determined as being between the upper, lower, left and right edges. Having determining the edges of each individual chip and thereby all pixel values which make up an individual chip, processor 12 subjects the pixel values that make up a chip to conventional statistical algorithms. The algorithms calculate the mean, median and standard deviation for pixel values making up each chip. It is to be understood that the mean, median and standard deviation are not the only statistics that can be performed. The statistics performed are dictated by the chip classification scheme. Therefore, many other statistical analyses can be performed on the pixel values representative of each chip for classification purposes. In the present embodiment, the mean, median and standard deviation of each chip are inserted into a computational formula, such as a multiple linear regression equation whereby the computed value represents a number which uniquely classifies the chip as a member of one or more classes. The class a chip falls into dictates the value attached to the chip and reported by the system 10.

Within the RAM 14, all possible classification scheme values that can be determined based on inputs to the computational formula, are precalculated based on utilizing all possible means, modes and standard deviations for a casino's set of gambling chips. The classification scheme values are precalculated by way of inputting all possible precalculated means, median and standard deviation values into the computational formula and storing the results. The classification of each chip is determined by comparing the classification scheme representation derived by the chip value mean, median, and standard deviation being input into the computational formula with the predetermined classification scheme representations. Each predetermined classification scheme representation is indexed with an actual gambling chip casino value allowing the amount bet to be determined from the stack of gambling chips. The number of chips bet can be determined by the processor counting the number of edges detected. For example 2 edges=1 chip, 3 edges=2 chips, 4 edges=3 chips, etc.

Edges can be thought of as pixel locations having abrupt grey-level or color-level changes. Edge detection is highly dependent on the apriori knowledge about the general nature of the image. In the present system, the gambling chip size and colors will be known. Edges will be defined based upon the predetermined chip size.

The communications link 20 constitutes the devices which forward the results of the count and chip value determination performed by the processor. These devices include a video display whereby an operator can see the results of the processing displayed as a dollar value and count of the stack of chips, as well as digital communications whereby the data is conveyed to another computing system, i.e., via ethernet, wherein the betting information is stored in a conventional database containing an individual's transaction history.

What is claimed is:

1. A computer implemented gambling chip recognition system for automatically determining the number of chips and the value of each chip within a stacked pile of one or more chips comprising:

an imager for generating an image of at least one chip;

data storage electrically interconnected to said imager for storing at least a portion of said image, said data storage storing a plurality of predetermined chip representations, wherein said plurality of predetermined chip representations define a gambling chip value classification system with each predetermined chip representation having a gambling chip value assigned thereto; and a processor electrically interconnected to said data storage for processing said image to determine the number of chips within the stacked pile and generate a chip representation for each chip, said processor determining the number of chips within the stacked pile by identifying chip edges for each chip within said image.

2. The computer implemented gambling chip recognition system of claim 1 wherein said imager comprises:

an image converter for converting a video image to a digital image wherein each discrete pixel of data within said video image is represented digitally.

3. The computer implemented gambling chip recognition system of claim 2 wherein said image converter converts said video image to a digital image by converting each pixel of data within said frame of said video image to a digital representation.

4. The computer implemented gambling chip recognition system of claim 3 wherein said system stores said digital representation of said image.

5. A computer implemented method for determining the number of chips and the value assigned each chip within a stacked pile of one or more gambling chips comprising the steps of:

imaging the stacked pile of chips;

storing said image;

determining the number of chips within the stacked pile of chips by identifying chip edges for each chip within said image; and determining a chip representation for each chip within the stacked pile of chips by comparing each said chip representation with a plurality of predetermined chip representations wherein each predetermined chip representation defines a casino chip having a specific monetary value.

6. A gambling chip recognition system for automatically determining the number of chips and the value of each chip within a stacked pile of one or more chips comprising:

an imager for capturing a digital representation of an image representing the stacked pile of one or more chips;

data storage electrically connected to said processor and;

a processor electrically connected to said imager, said processor determining the number of chips within the stacked pile of one or more chips by identifying the edges of each chip, said edges of each chip identified by computing pixel variance value for pixels comprising said image, comparing said pixel variance values to a threshold variance values and applying an edge detection filter to said pixels comprising said image.

7. The gambling chip recognition system of claim 6 wherein said imager includes a video camera electrically connected to a frame grabber, said frame grabber capturing frames of video images generated by said video camera and converting said video images to digital representations.

8. The gambling chip recognition system of claim 6 wherein said data storage stores a plurality of predetermined chip representations, wherein said plurality of predetermined chip representations define a gambling chip value classification system with each predetermined chip representation having a gambling chip value assigned thereto.

9. The gambling chip recognition system of claim 6 wherein said processor processes said digital representations of said image representing the stacked pile of gambling chips to generate a chip representation for each chip and determine the number of chips, said processor compares each said chip representation against a plurality of predetermined chip representations to determine the value of each chip within the stacked pile.

10. The system of claim 1 wherein said data storage is an analog storage medium.

11. The system of claim 1 wherein said data storage is a digital storage medium.

12. The system of claim 1 wherein the portion of said image representing the stacked pile of chips is identified by computing a pixel variance value for pixels comprising said image and comparing each said pixel variance value to a threshold variance value.

13. The system of claim 1 wherein the edges of each individual chip within the stacked pile of chips is identified by computing a pixel variance value for pixels comprising said image, comparing each said pixel variance value to a threshold variance value and applying an edge detection filter to said pixels comprising said image.

14. The method of claim 5 wherein said processing step includes the steps of:

computing a pixel variance value for pixels comprising said image; and comparing each said pixel variance value comprising said image to a threshold variance value to identify the portion of said image representing the stacked pile of chips.

15. The method of claim 5 wherein said processing step includes the steps of:

identifying the edges of each individual chip within the stacked pile of chips by computing a pixel variance value for pixels comprising said image;

comparing each said pixel variance value to a threshold variance value; and applying an edge detection filter to said pixels comprising said image.

16. The system of claim 6 wherein said data storage stores a plurality predetermined chip representations, wherein said plurality of predetermined chip representations define a gambling chip classification system with each predetermined chip representation having a gambling chip value assigned thereto, said processor generating a chip representation for each chip and comparing each said chip representation against said plurality of predetermined chip representations to determine the value of each chip within the stacked pile.

* * * * *